United States Patent [19]
Mitsutake et al.

[11] Patent Number: 5,760,113
[45] Date of Patent: Jun. 2, 1998

[54] FLOOR POLISH COMPOSITION

[75] Inventors: Tatsuo Mitsutake; Yuuzi Yoshii, both of Chiba, Japan

[73] Assignee: Sumitomo Chemical Company, Limited, Osaka, Japan

[21] Appl. No.: 723,127

[22] Filed: Sep. 30, 1996

[30] Foreign Application Priority Data

Sep. 29, 1995 [JP] Japan ................. 7-253001

[51] Int. Cl.$^6$ ................. C09G 1/16; C09G 1/10
[52] U.S. Cl. ................. 524/161; 524/745; 524/490
[58] Field of Search ................. 524/158, 745, 524/161, 914; 526/225

[56] References Cited

U.S. PATENT DOCUMENTS

| | | |
|---|---|---|
| 3,308,078 | 3/1967 | Rogers et al. |
| 3,328,325 | 6/1967 | Zdanowski. |
| 3,403,119 | 9/1968 | Sullivan et al. ................. 524/399 |
| 4,771,098 | 9/1988 | Siol et al. ................. 526/225 |
| 5,194,469 | 3/1993 | Srail et al. ................. 524/745 |

FOREIGN PATENT DOCUMENTS

| | | |
|---|---|---|
| 0 172 531 | 2/1986 | European Pat. Off. . |
| 4-225065 | 8/1992 | Japan. |
| 5-1259 | 1/1993 | Japan. |
| 5-78619 | 3/1993 | Japan. |

*Primary Examiner*—Veronica P. Hoke
*Attorney, Agent, or Firm*—Sughrue, Mion, Zinn Macpeak & Seas, PLLC

[57] ABSTRACT

A floor polish composition comprising an aqueous emulsion which comprises as a copolymer having an average particle size of from 0.05 to 0.10 μm and having a glass transition temperature of from 30° to 50° C. which is obtainable by polymerization of (A) to (C) described below in the presence of an alkylbenzenesulfonate containing an alkyl group having 10 to 16 carbon atoms in an amount of 0.5 to 2.5 parts by weight per 100 parts by weight of the total amount of (A) to (C):

(A): 30 to 50% by weight of an aromatic vinyl compound, (B): 30 to 60% by weight of a (meth)acrylate, and (C): 10 to 20 % by weight of an α, β-ethylenically unsaturated carboxylic acid.

12 Claims, No Drawings

FLOOR POLISH COMPOSITION

FIELD OF THE INVENTION

The present invention relates to a floor polish composition. More particularly, the present invention relates to a floor polish composition of which gloss and durability are simultaneously improved and which is also excellent in film forming property and leveling property.

BACKGROUND OF THE INVENTION

As properties required for what is called a floor polish composition which gives gloss to a floor and protects the floor surface against scratch, there are listed gloss, durability, film forming property, leveling property (ability to be applied uniformly without irregularity) and the like. Among them, gloss and durability manifest opposed tendencies, therefore, it is difficult to improve the both properties simultaneously. Up to now, there has been known no floor polish composition of which all the above-described properties are improved at the same time.

The present inventors have intensively studied and developed a floor polish composition not having the above-mentioned problems. As a result of such study, the inventors have found that a floor polish composition comprising an aqueous emulsion which comprises a composition obtainable by adding a specific surfactant to a polymer component of specific composition improves gloss and durability simultaneously and is also excellent in film forming property and leveling property.

SUMMARY OF THE INVENTION

The present invention relates to a floor polish composition comprising an aqueous emulsion which comprises a copolymer having an average particle size of from 0.05 to 0.10 μm and having a glass transition temperature of from 30° to 50° C. which is obtained by polymerization of components (A) to (C) described below in the presence of an alkylbenzenesulfonate containing an alkyl group having 10 to 16 carbon atoms in an amount of 0.5 to 2.5 parts by weight per 100 parts by weight of the total amount of (A) to (c):

(A): 30 to 50% by weight of an aromatic vinyl compound,
(B): 30 to 60% by weight of a (meth)acrylate, and
(C): 10 to 20% by weight of an α, β-ethylenically unsaturated carboxylic acid.

DETAILED DESCRIPTION OF THE INVENTION

As the aromatic vinyl compound constituting component (A) of the copolymer used in the present invention, styrene, α-methylstyrene and the like are specific examples, styrene is preferably used. The content of (A) in the copolymer is from 30 to 50% by weight. When the content is too small, gloss becomes worse. On the other hand, when the content is too large, durability becomes worse.

The (meth)acrylate constituting component (B) of the copolymer of the present invention is an acrylate or (meth) acrylate. Specific examples include methyl acrylate, ethyl acrylate, n-propyl acrylate, isopropyl acrylate, n-butyl acrylate, isobutyl acrylate, tert-butyl acrylate, amyl acrylate, hexyl acrylate, heptyl acrylate, octyl acrylate, 2-ethylhexyl acrylate, decyl acrylate, lauryl acrylate, stearyl acrylate, methyl methacrylate, ethyl methacrylate, n-propyl methacrylate, isopropyl methacrylate, n-butyl methacrylate, isobutyl methacrylate, tert-butyl methacrylate, amyl methacrylate, hexyl methacrylate, 2-ethylhexyl methacrylate, dodecyl methacrylate, lauryl methacrylate, and stearyl methacrylate. Among them, methyl acrylate, ethyl acrylate, n-butyl acrylate, 2-ethylhexyl acrylate and methyl methacrylate are preferably used, and n-butyl acrylate, 2-ethylhexyl acrylate and methyl methacrylate are more preferably used. These may be used alone or as a mixture thereof. The content of component (B) in the copolymer is from 30 to 60% by weight, preferably from 35 to 55% by weight. When the content is too small, durability becomes worse. On the other hand, when the content is too large, gloss becomes worse.

As the (C) component, the α, β-ethylenically unsaturated carboxylic acid, acrylic acid, methacrylic acid, crotonic acid, itaconic acid, maleic acid, fumaric acid, maleic anhydride are specific examples. Among them, acrylic acid and methacrylic acid are preferably used, and methacrylic acid is most preferably used. The content of component (C) in the copolymer is from 10 to 20% by weight. When the content is too small, durability becomes worse. On the other hand, when the content is too large, the viscosity of the emulsion increases and the leveling property and gloss becomes worse. While these ranges are preferred, minor variations can be made while still accomplishing the desired results of the invention.

When the components (A)–(C) are used as a mixture, the content of each component (A)–(C) is based on the total amount. The total amount of (A)–(C) is to be 100% by weight.

The copolymer of the present invention is obtained by polymerization of (A) to (C) in the presence of an alkylbenzenesulfonate containing an alkyl group having 10 to 16 carbon atoms. The amount to be used is from about 0.5 to about 2.5 parts by weight, preferably from 1.0 to 2.0 parts by weight per 100 parts by weight of the total amount of (A) to (C). A specific example of the alkylbenzenesulfonate is sodium dodecylbenzenesulfonate. When a copolymer is used which has been obtained without using the alkylbenzenesulfonate of the present invention, excellent leveling property cannot be realized. When the amount of the alkylbenzenesulfonate is too small, the polymerization reaction is unstable and a stable emulsion cannot be obtained. On the other hand, when the amount to be used is too large, durability becomes worse and further, gloss in a high humidity atmosphere is lowered.

The glass transition temperature of the copolymer used in the present invention is required to be from about 30° to about 50° C., and preferably is from 35° to 45° C. When the temperature is too low, durability becomes worse. On the other hand, when the temperature is too high, the film forming property becomes worse and a film once formed may be easily peeled. Here, glass transition temperature can be calculated according to the Fox formula.

The copolymer of the present invention has an average particle size of from about 0.05 to about 0.10 μm. When the average particle size is too small, the viscosity of the emulsion increases and the leveling property becomes worse. On the other hand, when the average particle size is too large, gloss becomes worse. Here, an average particle size is measured by a light scattering mode measuring apparatus (for example, LA-910" manufactured by HORIBA SEISAKUSHO Ltd.).

As a method to obtain the aqueous emulsion composition of the present invention, the following method is an example. Water and an alkylbenzenesulfonate are charged into a polymerization vessel, and the mixture is heated to about 60° to 80° C. Then, a polymerization initiator and (A) to (C) are added to this mixture and polymerization is carried out over 4 to 5 hours. As the polymerization initiator, hydrogen peroxide, potassium persulfate, sodium persulfate, ammonium persulfate, tert-butyl hydroperoxide and the like may used alone or may be used combined with a reducer such as L-, D-ascorbic acid, sulfite, Rongalite and ferrous sulfate as a redox system. In the polymerization, there may be used pH regulators, for example, a base such as an alkaline metal hydroxide, ammonia water or amine, an acid such as hydrochloric acid, phosphoric acid, acetic acid, succinic acid or carbonic acid, or a salt thereof, and further, a chain transfer agent such as mercaptans may be used.

The aqueous emulsion composition of the present invention comprises the above-described copolymer as a polymer component; the solids content thereof is preferably from 30 to 50% by weight. The aqueous emulsion composition of the present invention is completed to the final product floor polish composition by addition of general additives for a floor polish composition. As such additives, a wax, an alkali soluble resin, a wetting agent, an emulsifier, a dispersant, a polyvalent metal compound are examples. The solids content of the final product floor polish composition is preferably around 20% by weight.

The floor polish composition of the present invention has an excellent glossiness, as described below of not less than 84. The composition is one in which gloss and durability are simultaneously improved and also has an excellent film forming property and leveling property. The compositions are preferably used for surfaces made of synthetic resin, such as vinyl chloride resin, stones such as marble, or concrete and the like.

EXAMPLES

The present invention will be further explained in detail in the following examples, but, needless to say, it is not construed to be limited by them.

Each property is evaluated as follows.

(1) Durability

Durability was evaluated by degree of adhesion of Black Heel Mark test, Japan Floor Polish Association (JFPA) Standard No. 10. Namely, a floor polish composition was spread uniformly on a homogeneous tile of 225 mm×225 mm so that the amount of the polish was 10 g/m². After spreading, the tile was allowed to stand still and was dried for not less than 30 minutes. This procedure was repeated three times to make a sample. This tile was fitted to a Heel Mark testing machine, and six black rubber blocks blended with carbon black, each having a weight of 175 g and a size of 50 mm×50 mm×50 mm, were inserted. Rotation at 50 r.p.m. was conducted for five minutes and then, reverse rotation was conducted for 5 minutes. The tile was taken out of the Heel Mark testing machine, and degree of adhesion of Black Heel Mark was visually observed.

o: almost no adhesion of Black Heel Mark
Δ: a little adhesion of Black Heel Mark
X: intense adhesion of Black Heel Mark (2) Gloss Gloss was measured according to Japan Floor Polish (JFPA) Standard No. 10. A sample was made in the same manner as in the evaluation of Black Heel Mark. Reflectance was measured when incident angle and reception angle were respectively 60° by a mirror surface glossmeter. Degree of gloss was represented as a percentage of standard gloss, based on a mirror surface gloss of 100.

(3) Leveling Property

A floor polish composition was spread uniformly on a homogeneous tile so that the amount of the polish was 10 g/m². After spreading, the tile was allowed to stand still and was dried for not less than 30 minutes. In the second spread, the floor polish composition was spread uniformly by a gauze so that the amount of the sample was 15 g/m², and immediately after spreading, a letter X" was written on the spreading surface along diagonal lines of the substrate. After the film of the floor polish composition had dried, the degree of extinction of X" was judged visually in accordance with the following criteria.

o: a letter "X" is not recognized
Δ: a letter "X" is recognized a little bit, but elevation of the film is scarcely recognized (film surface is almost smooth).
X: a letter "X" is recognized clearly, and elevation of the film is recognized (film surface is rough).

(4) Film forming property

A sample was made in the same manner as in the evaluation of Black Heel Mark in an environment of 5° C., and the degree of film forming property was evaluated.

o: no crack is recognized in a film, and the film forming property is excellent.
Δ: a small crack is recognized in the film.
X: many cracks are recognized in the film.

Example 1

[Preparation of aqueous emulsion]

To a 5 L reaction vessel made of SUS (stainless steel) equipped with a stirrer and a reaction temperature regulator was charged 90 g of sodium dodecylbenzenesulfonate, NEOPEREX F-25 (manufactured by KAO Ltd., effective component content is 25%) and 2000 g of water; thereafter the temperature was increased to 75° C., Component (A): 600 g of styrene, component (B): 450 g of butyl acrylate and 225 g of methyl methacrylate, and component (C): 225 g of methacrylic acid were added to the reaction system at a constant rate over 4 hours. At the same time 150 g of a 4% aqueous potassium persulfate solution was added to the reaction system at a constant rate over 5 hours. An aqueous emulsion was obtained having a solids content of 40%; the particle size of the copolymer was 0.07 μm and the Tg was 43° C.).

[Preparation of floor polish composition]

A floor polish composition was prepared in the following recipe using the obtained aqueous emulsion.

Floor Polish Composition Formulation

Emulsion[1], for floor polish composition—85 parts by weight
Polyethylene wax emulsion[2]—15 parts by weight
Fluorine based surfactant[3]—1.0 parts by weight
Polyvalent metal compound[4]—4.0 parts by weight
Tributoxyethyl phosphate—2.0 parts by weight
Dibutyl phthalate—2.0 parts by weight
Methyl carbitol—3.0 parts by weight (numerical value indicates part by weight of a component)

1) the emulsion made in Example 1 which has been regulated to a 35% by weight emulsion by addition of water.
2) one which has been regulated to a 25% by weight emulsion of oxidation type polyethylene wax AC-629 manufactured by Allied Chemical Ltd. USA.

3) one which has been regulated to a 1% by weight composition of FC-129 manufactured by SUMITOMO 3M Ltd.

4) one which has been obtained by mixing and dissolution of 14 parts by weight of ZnO, 12 parts by weight of ammonium carbonate, 20 parts by weight of aminoacetic acid, 30 parts by weight of 28 % ammonia water and 100 parts by weight of water.

The floor polish composition was finally regulated to a 20% by weight composition by addition of water. The resulting composition and the results of testing are shown in Table 1.

Examples 2 and 3 and Comparative Examples 1 to 9

The same procedure as Example 1 was repeated except that conditions set forth in Tables 1 to 3 were adopted. The testing results are shown in Tables 1 to 3.

TABLE 1

| | Examples | | | | | |
|---|---|---|---|---|---|---|
| | 1 | 2 | 3 | 4 | 5 | 6 |
| Copolymer Constitution wt %*1 | | | | | | |
| (A) St | 40 | 40 | 40 | 35 | 45 | 40 |
| (B) MMA | 15 | 20 | 15 | 20 | 7 | 15 |
| nBA | 30 | 0 | 30 | 33 | 30 | 30 |
| 2EHA | 0 | 25 | 0 | 0 | 0 | 0 |
| (C) MAA | 15 | 15 | 10 | 12 | 18 | 15 |
| AA | 0 | 0 | 5 | 0 | 0 | 0 |
| Glass transition temperature °C. | 43 | 43 | 41 | 36 | 44 | 43 |
| Average particle size μm | 0.07 | 0.07 | 0.07 | 0.08 | 0.07 | 0.06 |
| Additive in polymerization*2 | | | | | | |
| DBS | 1.5 | 1.5 | 1.5 | 1.2 | 1.8 | 2.0 |
| SLS | 0 | 0 | 0 | 0 | 0 | 0 |
| POENP | 0 | 0.5 | 0 | 0 | 0 | 0 |
| Evaluation | | | | | | |
| Durability | ○ | ○ | ○ | ○ | ○ | ○ |
| Gloss | 87 | 85 | 86 | 84 | 87 | 85 |
| Leveling property | ○ | ○ | ○ | ○ | ○ | ○ |
| Film forming property | ○ | ○ | ○ | ○ | ○ | ○ |

TABLE 2

| | Comparative Examples | | | | |
|---|---|---|---|---|---|
| | 1 | 2 | 3 | 4 | 5 |
| Copolymer Constitution wt %*1 | | | | | |
| (A) St | 40 | 40 | 40 | 40 | 40 |
| (B) MMA | 15 | 15 | 15 | 25 | 0 |
| nBA | 30 | 30 | 30 | 20 | 45 |
| 2EHA | 0 | 0 | 0 | 0 | 0 |
| (C) MAA | 15 | 15 | 15 | 15 | 15 |
| AA | 0 | 0 | 0 | 0 | 0 |
| Glass transition temperature °C. | 43 | 43 | 43 | 63 | 16 |
| Average particle size μm | 0.08 | 0.06 | 0.21 | 0.07 | 0.08 |
| Additive in polymerization*2 | | | | | |
| DBS | 0 | 5.0 | 1.0 | 1.5 | 1.5 |
| SLS | 1.5 | 0 | 0 | 0 | 0 |
| POENP | 0 | 0 | 1.0 | 0 | 0 |

TABLE 2-continued

| | Comparative Examples | | | | |
|---|---|---|---|---|---|
| | 1 | 2 | 3 | 4 | 5 |
| Evaluation | | | | | |
| Durability | ○ | Δ | ○ ≈ Δ | Δ | X |
| Gloss | 82 | 80 | 70 | 78 | 82 |
| Leveling property | Δ | Δ ≈ ○ | Δ | Δ | ○ |
| Film forming property | ○ | ○ | ○ | X | ○ |

TABLE 3

| | Comparative Examples | | | |
|---|---|---|---|---|
| | 6 | 7 | 8 | 9 |
| Copolymer Constitution wt %*1 | | | | |
| (A) St | 55 | 10 | 40 | 40 |
| (B) MMA | 0 | 43 | 0 | 26 |
| nBA | 30 | 32 | 35 | 29 |
| 2EHA | 0 | 0 | 0 | 0 |
| (C) MAA | 15 | 15 | 25 | 5 |
| AA | 0 | 0 | 0 | 0 |
| Glass transition temperature °C. | 42 | 40 | 38 | 40 |
| Average particle size μm | 0.07 | 0.07 | 0.07 | 0.08 |
| Additive in polymerization*2 | | | | |
| DBS | 1.5 | 1.5 | 1.5 | 1.5 |
| SLS | 0 | 0 | 0 | 0 |
| POENP | 0 | 0 | 0 | 0 |
| Evaluation | | | | |
| Durability | Δ | ○ | ○ | X |
| Gloss | 87 | 65 | 72 | 86 |
| Leveling property | ○ | ○ | X | ○ |
| Film forming property | ○ | ○ | ○ | ○ |

*1 Copolymer
St: styrene
MMA: methyl methacrylate
nBA: n-butyl acrylate
2EHA: 2-ethylhexyl acrylate
MMA: methacrylic acid
AA: acrylic acid
The numerical value in each Table indicates % by weight in the copolymer
*2 Additive in polymerization
DBS: sodium dodecylbenzenesulfonate
SLS: sodium lauryl sulfate
POENP: polyoxyethylene nonyl phenyl ether
The numerical value in each Table indicates parts by weight of an additive per 100 parts by weight of the total amount of the constituents of the copolymer.

The results set forth in the Tables demonstrate that the compositions of the invention exhibit improved gloss and durability as well as excellent film-forming and leveling properties.

While specific embodiments of the invention have been described, it will be understood by those of skill in the art that modifications may be made without departing from the spirit of the invention.

What is claimed is:

1. A floor polish composition comprising an aqueous emulsion which comprises a copolymer having an average particle size of from 0.05 to 0:10 μm and having a glass transition temperature of from 30° to 50° C. which copolymer is obtained by polymerization of components (A) to (C) in the amounts described below based on 100 parts by weight of the total amount of (A) to (C) in the presence of a sodium alkylbenzenesulfonate containing an alkyl group having 10 to 16 carbon atoms in an amount of about 0.5 to about 2.5 parts by weight per 100 parts by weight of the total amount of (A) to (C) and general additives:

(A): 30 to 50% by weight of an aromatic vinyl compound, (B): 30 to 60% by weight of a (meth)acrylate, and (C): 10 to 20% by weight of an α, β-ethylenically unsaturated carboxylic acid.

2. The floor polish composition according to claim 1, wherein the alkylbenzenesulfonate containing an alkyl group having 10 to 16 carbon atoms is used in an amount of 1.0 to 2.0 parts by weight per 100 parts by weight of the total amount of (A) to (C).

3. The floor polish composition according to claim 1, wherein the glass transition temperature of said copolymer is from 35° to 45° C.

4. The floor polish composition according to claim 1, wherein component (B) is used in an amount of 35 to 55% by weight.

5. The floor polish composition according to claim 1, wherein the aromatic vinyl compound of component (A) is styrene or α-methylstyrene.

6. The floor polish composition according to claim 1, wherein the aromatic vinyl compound of component (A) is styrene.

7. The floor polish composition according to claim 1, wherein the (meth)acrylate of component (B) is selected from the group consisting of methyl acrylate, ethyl acrylate, n-butyl acrylate, 2-ethylhexyl acrylate and methyl methacrylate.

8. The floor polish composition according to claim 1, wherein the (meth)acrylate of component (B) is selected from the group consisting of n-butyl acrylate, 2-ethylhexyl acrylate and methyl methacrylate.

9. The floor polish composition according to claim 1, wherein the α, β-ethylenically unsaturated carboxylic acid of component (C) is methacrylic acid or acrylic acid.

10. The floor polish composition according to claim 1, wherein the α, β-ethylenically unsaturated carboxylic acid of component (C) is methacrylic acid.

11. The floor polish composition according to claim 1, wherein the general additives are selected from a group consisting of a wax, an alkali soluble resin, a wetting agent, an emulsifier, a dispersant and a polyvalent metal compound.

12. The floor polish composition according to claim 1, wherein said alkylbenzenesulfonate is sodium dodecylbenzenesulfonate.

* * * * *